United States Patent
Masters et al.

(10) Patent No.: US 7,726,220 B2
(45) Date of Patent: Jun. 1, 2010

(54) INNER AND OUTER DIAMETER CHUCK FOR A LASER CUTTING/ENGRAVING ROTARY FIXTURE

(75) Inventors: Roy Masters, Golden, CO (US); John Ellis, Lafayette, CO (US); Chad A Mitchiner, Golden, CO (US)

(73) Assignee: Epilog Corporation, Golden, CO (US)

( * ) Notice: Subject to any disclaimer, the term of this patent is extended or adjusted under 35 U.S.C. 154(b) by 1113 days.

(21) Appl. No.: 11/366,772

(22) Filed: Mar. 1, 2006

(65) Prior Publication Data

US 2007/0205568 A1 Sep. 6, 2007

(51) Int. Cl.
*B23B 23/00* (2006.01)
*B23B 31/02* (2006.01)

(52) U.S. Cl. .............................. 82/170; 82/164; 82/165

(58) Field of Classification Search .................. 82/170, 82/164, 165, 150; 279/133; 29/27 C, 27 R
See application file for complete search history.

(56) References Cited

U.S. PATENT DOCUMENTS

| | | | | | |
|---|---|---|---|---|---|
| 2,309,260 | A | * | 1/1943 | Strauss | 82/1.11 |
| 2,511,930 | A | * | 6/1950 | Martens | 82/164 |
| 2,757,008 | A | * | 7/1956 | Lane | 279/110 |
| 3,156,480 | A | * | 11/1964 | Wuesthoff | 279/119 |
| 4,114,910 | A | * | 9/1978 | Reeder | 279/123 |
| 4,838,561 | A | * | 6/1989 | Baranzelli et al. | 279/127 |
| 4,868,969 | A | * | 9/1989 | Cerny | 29/558 |
| 7,039,992 | B2 | * | 5/2006 | Tokuma et al. | 29/27 C |

OTHER PUBLICATIONS

Xenetech Engraving Systems, Accessories/Extras, Engraving Systems Attachments From http://www.xenetech.com Dated Jul. 7, 2006.
Xenetech Engraving Systems, Accessories/Extras, Xenetech Custom Engineering From http://www.xenetech.com Dated Jul. 7, 2006.

* cited by examiner

*Primary Examiner*—Will Fridie, Jr.
(74) *Attorney, Agent, or Firm*—Swanson & Bratschun, L.L.C.

(57) ABSTRACT

A chuck for a laser cutting/engraving rotary fixture comprises a chuck plate having a chuck plate axis of rotation and at least two mount brackets spaced symmetrically radially with respect to one another about the chuck plate axis of rotation. Each mount bracket comprises an inclined contact surface and each mount bracket is rotatably attached to the chuck plate about the mount bracket axis of rotation. The inclined contact surface can be selectively rotated between a first position with the inclined contact surface inclined toward the mount plate axis of rotation and a second position with the inclined contact surface inclined away from the mount plate axis of rotation. An effectively concave contact surface is defined with each of the inclined contact surfaces in the first position. An effectively convex contact surface is defined with each of the mount brackets in the second position for engaging an inner diameter of a work piece.

18 Claims, 5 Drawing Sheets

INNER AND OUTER DIAMETER CHUCK FOR A LASER CUTTING/ENGRAVING ROTARY FIXTURE

TECHNICAL FIELD

The present invention is directed toward laser cutting/engraving machines, and more particularly toward a chuck for a laser cutting/engraving rotary fixture.

BACKGROUND OF THE INVENTION

Laser cutting/engraving machines for cutting and engraving work pieces have been enjoying increased sales as the machines increase in performance and decrease in cost, thus making them available for a wider variety of cutting and engraving applications. Typically, laser cutting/engraving machines operate by directing a laser beam along x and y axes relative to a fixed work surface bearing a work piece. For many applications, the surface to be cut or engraved is substantially planar and the work piece can simply be set upon the work surface and secured thereto while the laser beam is directed along the x and y axis by, for example, a programmable microprocessor. However, where a surface to be engraved is curved, for example cylindrical, it can not be readily engraved in the same manner as a planar surface because the curved surface varies in distance along a z axis from the laser beam source. To address this problem, numerous manufacturers of laser cutting/engraving machines have developed rotary fixtures to rotate work pieces having cylindrical and other curvilinear surfaces (which will be collectively called "substantially cylindrical" herein) about an axis of rotation of the work piece to present the engraving surface at a fixed distance along the z axis from the laser source.

Typically laser cutting/engraving rotary fixtures include a master spindle operatively associated with a motor for rotating the master spindle and a slave spindle spaced from the master spindle along an axis of rotation. A chuck is provided in operative association with each spindle for securing a substantially cylindrical work piece between the master and slave spindles along an axis of rotation of the work piece. The slave spindle is typically movable relative to the master spindle along the axis of rotation so that a work piece can be compressed between the chucks associated with the spindles to secure the work piece for rotation about the axis of rotation by actuation of the master spindle. Known laser cutting/engraving rotary fixtures provide chucks presenting either an effectively concave contact surface for engaging an outer diameter of a substantially cylindrical work piece or an effectively convex contact surface for engaging an inner diameter of a substantially cylindrical work piece. As used herein, "effective concave" and "effectively convex" means a surface or surface segments that function as curved or linear concave or convex surfaces. If a substantially cylindrical work piece having two outer diameters and no inner diameter is provided, two opposing effectively concave chucks must be used on the master and slave spindles. If the work piece presents only two inner diameters suitable for engagement, a convex chuck must be associated with each of the master and slave spindles. Thus, conventional laser cutting/engraving rotary fixtures require up to four chucks (two with effectively concave contacting surfaces and two with effectively convex contacting surfaces). In addition, known laser cutting/engraving rotary fixtures require removal of an effectively concave or convex chuck in order to replace it with the other. Typically, removal of the chucks requires use of tools. Thus, between keeping track of the necessary effectively concave and convex chucks and the tools for changing out the chucks, conventional systems can create a cluttered work space and the opportunity for losing essential items. In addition, the process of changing out the effectively concave or convex chucks can be time consuming and difficult, particularly when a variety of different substantially cylindrical objects are being engraved. Yet another problem with existing laser cutting/engraving rotary fixture chucks is manufacturers must carry at least two SKU's to provide their customers with the necessary chuck options.

The present invention is intended to overcome one or more of the problems discussed above.

SUMMARY OF THE INVENTION

A first aspect of the present invention is a chuck for a laser cutting/engraving rotary fixture. The chuck comprises a chuck plate having a chuck plate axis of rotation. At least two mount brackets are spaced symmetrically radially with respect to one another about the chuck plate axis of rotation. Each mount bracket comprises an inclined contact surface. Each mount bracket is rotatably attached to the chuck plate about a mount bracket axis of rotation. As a result, the inclined contact surface can be selectively rotated between a first position with the inclined contact surface inclined toward the mount plate axis of rotation and a second select position with the inclined contact surface inclined away from the mount plate axis of rotation.

The chuck may include means for releasably securing each mount bracket in one of the first and second positions. The releasably securing means may comprise at least one mating projection and hole radially spaced from the mount bracket axes of rotation between the chuck plate and each mount bracket. In one embodiment, the projection comprises a spring detent. In another embodiment, the projection comprises a post and the releasably securing means further comprises a spring biasing each post and hole into mating engagement. In a further embodiment, the releasably securing means comprises at least two mating projections and holes symmetrically disposed relative to the mount bracket axis of rotation whereby the projections and holes mate with the bracket in each of the first and second positions. An engagement pad may be attached to the inclined contact surface.

Another aspect of the invention is a laser cutting/engraving rotary fixture. The fixture comprises opposing master and slave spindles rotatably mounted to a frame. The slave spindle is releasably securable axially along the spindle axis of rotation relative to the master spindle. Means are operatively associated with the moving means for releasably securing this slave spindle at a select axial distance from the master spindle along the spindle axis of rotation. A drive mechanism is operatively associated with the master spindle. A chuck is operatively associated with each of the master and slave spindles. The chuck comprises a chuck plate having a chuck plate axis of rotation and at least two mount brackets symmetrically spaced radially with respect to one another about the chuck plate axis of rotation. Each mount bracket comprises an inclined contact surface. Each mount bracket is rotatably attached to the chuck plate about a mount bracket axis of rotation. In this manner, the inclined contact surface can be selectively rotated between a first position with the inclined contact surface inclined toward the mount plate axis of rotation and a second position with the inclined contact surface inclined away from the mount plate axis of rotation. The chuck may include means for releasably securing each mount bracket in one of the first and second positions. The releasably securing means may comprise at least one mating projection and hole radially spaced from the mount bracket axis of rotation between the chuck plate and each mount bracket. The projection may be a spring detent. In another embodiment, the projection comprises a post and the releasably securing means further comprises a spring biasing each post and hole into mating engagement. The releasably securing means may further comprise at least two mating projections and holes symmetrically disposed relative to the mount bracket axis of rotation. An engagement pad may be attached to each inclined contact surface.

The chuck for a laser cutting/engraving rotary fixture in accordance with the present invention enables the chuck to be adapted for engaging the inner diameter of a substantially cylindrical work piece or an outer diameter of a substantially cylindrical work piece as required without detaching the chuck from the associated spindle. In addition, the chuck can be adapted to an effectively concave or convex contacting surface readily by a user without the use of any tools. Thus, the chuck for a laser cutting/engraving rotary fixture in accordance with the present invention eliminates the need to provide multiple effectively concave or convex chucks in order to accommodate various substantially cylindrical work pieces. These many advantages are provided by a chuck that is easily manufactured at minimal cost while having the further advantage of minimizing the number of chucks a manufacturer or vendor must stock in order to accommodate varying substantially cylindrical work pieces. A further advantage of the chuck of the present invention is that it can accommodate work pieces having varying inner diameters and outer diameters without requiring replacement of the chucks.

DETAILED DESCRIPTION OF THE DRAWINGS

Figure 1:
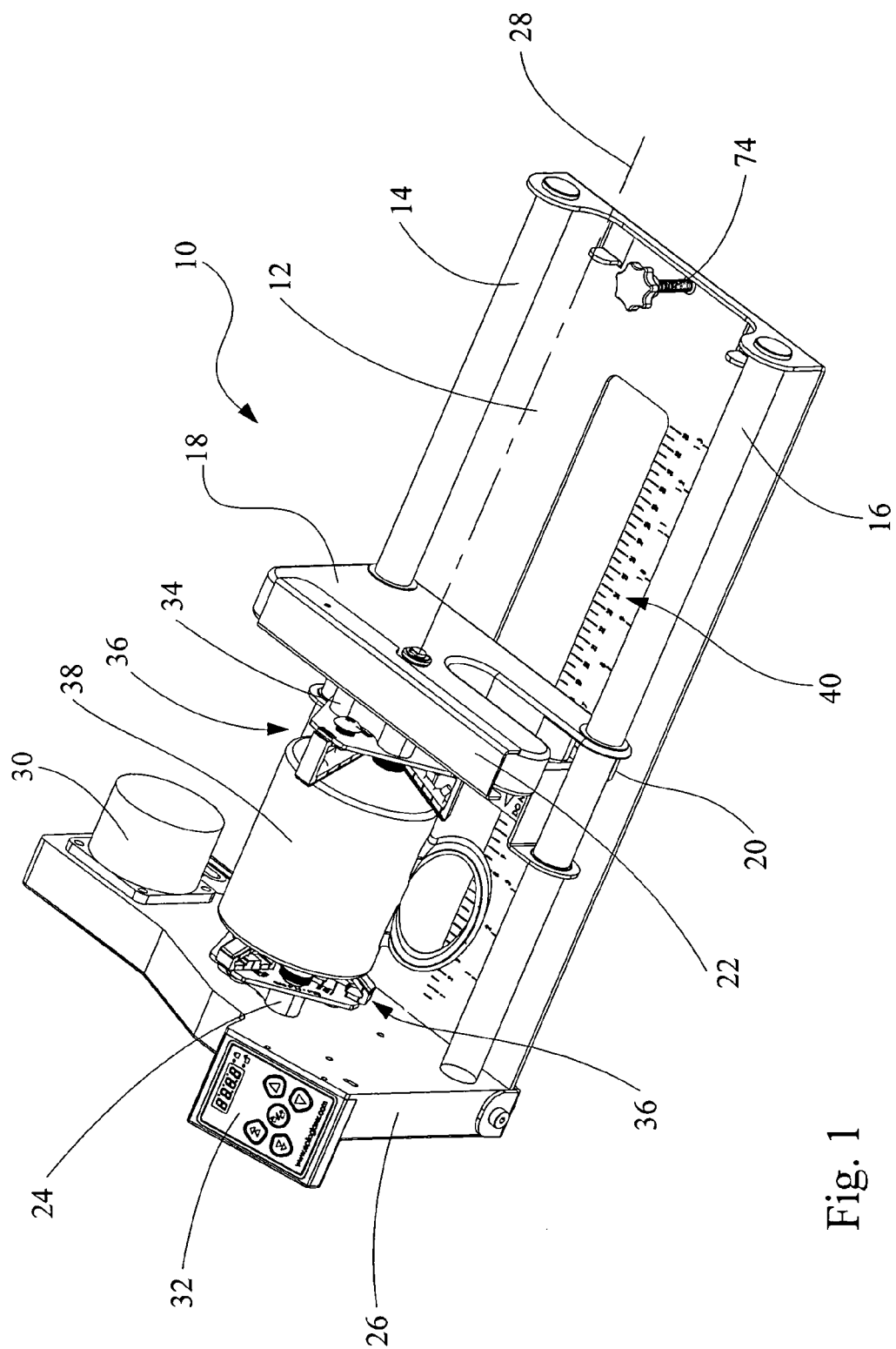
FIG. 1 is a perspective view of a laser cutting/engraving rotary fixture in accordance with the present invention.

A laser cutting/engraving machine rotary fixture 10 is shown in a perspective view in FIG. 1. As described in the background of the invention, the rotary fixture 10 is intended to rest upon a work surface of a laser cutting/engraving machine while positioning a "substantially cylindrical" work piece in operative association with a laser source of a laser cutting/engraving machine. The rotary fixture 10 of the present invention includes a frame 12 securing a pair of parallel rails 14, 16. A lateral clamp 18 rides on the rails 14, 16 and includes a locking mechanism consisting of a brake 20 operatively associated with an actuator handle 22. A master spindle 24 is mounted to a vertical end panel 26 of the frame 12 for rotation about a spindle axis of rotation 28. A motor 30 is operatively associated with the master spindle to rotate the master spindle about the spindle axis of rotation 28. A control panel 32 provides input to a microprocessor which controls actuation of the motor 30 and thereby the direction and rate of rotation of the master spindle 24 about the spindle axis of rotation 28.

A slave spindle 34 is rotatably mounted to the lateral clamp 18 also for rotation about the spindle axis of rotation 28. The slave spindle 34 rotates freely about the spindle axis of rotation 28.

A chuck 36 is attached to each of the master spindle 24 and the slave spindle 34. As illustrated in FIG. 1, a substantially cylindrical work piece 38 is axially received between the chucks 36.

The frame 12 includes lengthwise indicia 40 for determining the distance between the chucks 36 associated with the master and slave spindles 24, 34.

Figure 2:
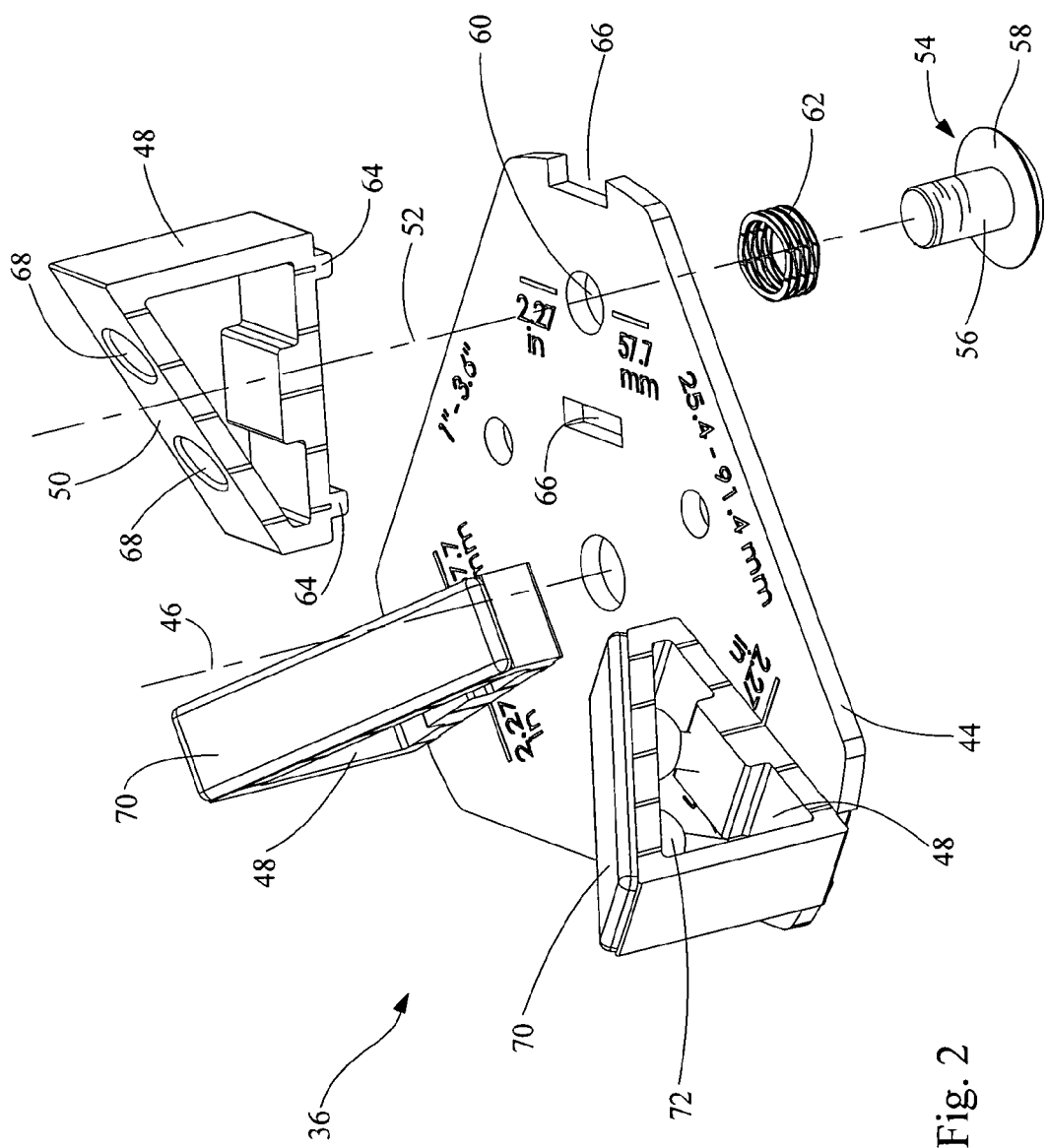
FIG. 2 is a partial exploded view of a chuck for a laser cutting/engraving rotary fixture in accordance with the present invention.
Figure 3:
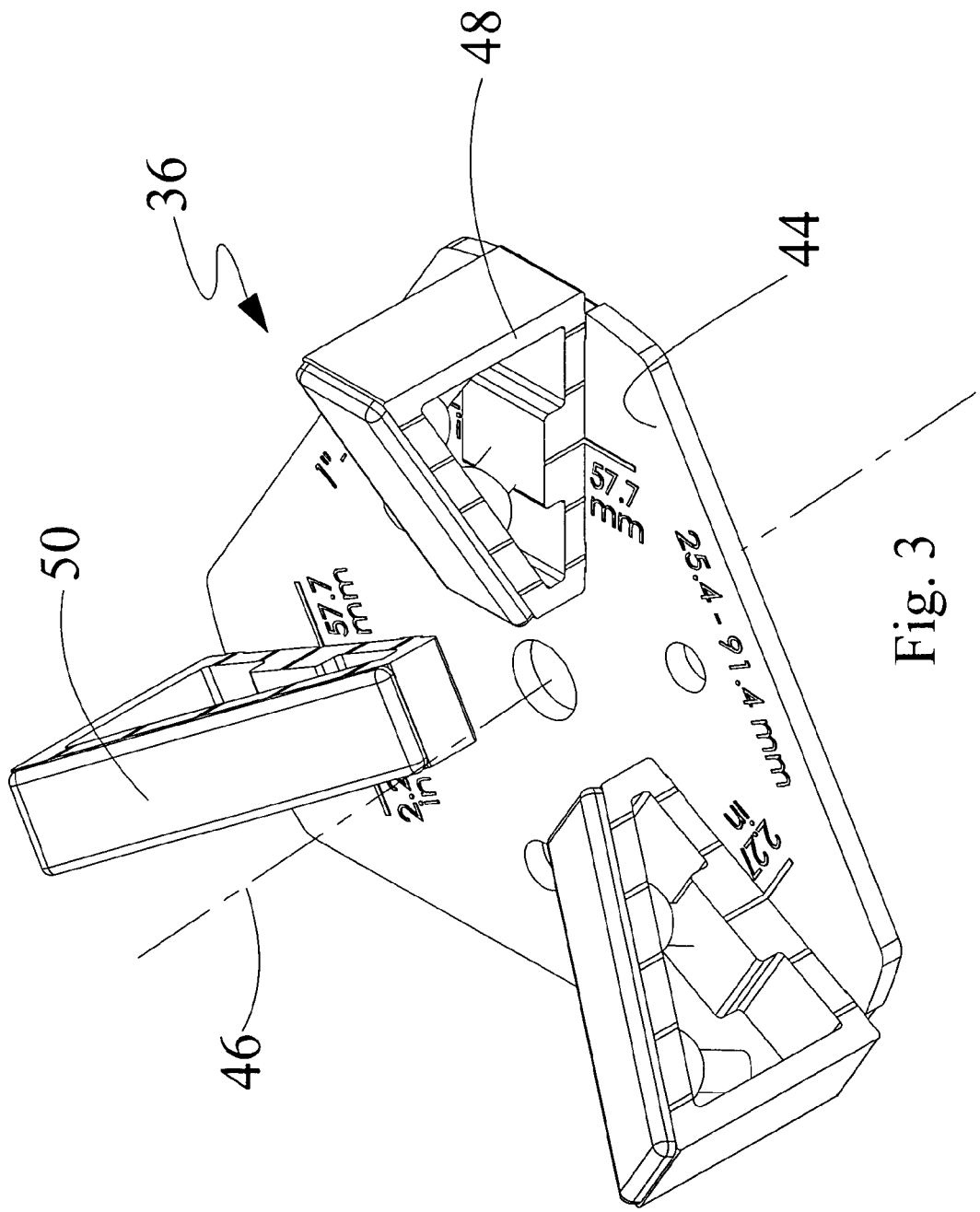
FIG. 3 is a perspective view of the chuck of FIG. 2 with the mount brackets defining an effectively concave contact surface.

FIG. 2 is a partially exploded view of a chuck 36. The chuck 36 includes a chuck plate 44 of a substantially triangular configuration having a chuck plate axis of rotation 46. The chuck 36 also includes a number of mount brackets 48 which are spaced symmetrically radially with respect to one another about the chuck plate axis 46. Each mount bracket includes an inclined contact surface 50. Each mount bracket 48 is rotateably mounted to the chuck plate about a mount bracket axis of rotation 52. In the embodiment of FIG. 2, the rotable attachment between the chuck plate and mount bracket is made by a screw 54 having a threaded shaft 56 and a head 58 which is received in a hole 60 in the chuck plate 44 along the mount bracket axis of rotation 52 and which is threadably engaged in an internally threaded hole 61 (See FIG. 5) in the bottom of the mount bracket 48. A spring 62 resides between the head 58 of the screw 54 and a bottom surface of the chuck plate 44 to bias the mount brackets 48 toward the chuck plate 44. Alternatively, the screw may be replaced by a pin having radial grooves at each end and the threaded hole in mount bracket 48 is replaced with a throughhole. The pin fits axially through the aligned holes and retaining clips are received in the radial grooves. The spring is received between the chuck plate bottom and the adjacent retaining clip. Each chuck plate 44 further includes at least one projection 64 extending axially from the bottom of the mount bracket 48. In the embodiment illustrated in FIG. 2, two projections or posts 64 are provided with each of the projections 64 being spaced symmetrically about the mount bracket axis of rotation. Mating holes 66 in the chuck plate 44 snugly receive the projections 64 and are similarly symmetrical spaced about the mount bracket axis of rotation on the chuck plate 44. With the mount brackets 48 rotatably attached to the chuck plate as illustrated in FIG. 2, each mount bracket can be secured relative to the chuck plate 44 in a first position with the inclined contact surface inclined toward the mount plate axis of rotation (see FIGS. 1, 2, and 3) and a second position with the inclined contact surface inclined away from the mount plate axis of rotation. (see FIG. 4) In either of the first and second positions, the projections or posts 64 matingly engage the holes 66 to maintain the mount bracket in the select first or second position. As should be readily apparent, the mount brackets can be readily switched between the first and second positions simply by grasping the mount brackets and raising them axially as viewed in FIG. 2 against the bias of the spring 62 to disengage the projections or posts 64 from the holes 66 and rotating the mount brackets 48 about the mount bracket axis 52.

As further illustrated in FIG. 2, a pair of button holes 68 are provided in the inclined surface. Contact pads 70 are attached to the inclined surface 50 by engaging rearwardly projecting buttons or barbs 72 through each of the button holes 68. The fully assemble chuck 36 is shown in an elevation view in FIG. 5 which further illustrates the buttons 72 received in the button holes 68. As an alternative to the projection/post structure depicted in FIGS. 2-5, spring detents could be substituted for the projections 64. In such an embodiment, the detent would be spherical and the holes 66 would be circular. Of course, the projection/post structure of spring detents can be switched between the chuck plate 44 and the mount brackets 48.

The contact pad 70 is preferably made of a high friction elastomer such as rubber and formed integrally therefrom. For example, they may be molded from soft (~45 Shore A durometer) urethane rubber. An integrally formed pair of barbed projections 72 on the back "snap" into the holes 68 on the chuck jaws 48. The rubber pads provide a rotational driving force or torque (a tangential force) which requires high friction as well as a centering (radial) force which requires low friction. The material and durometer are chosen to meet these cross-purposes.

Figure 4:
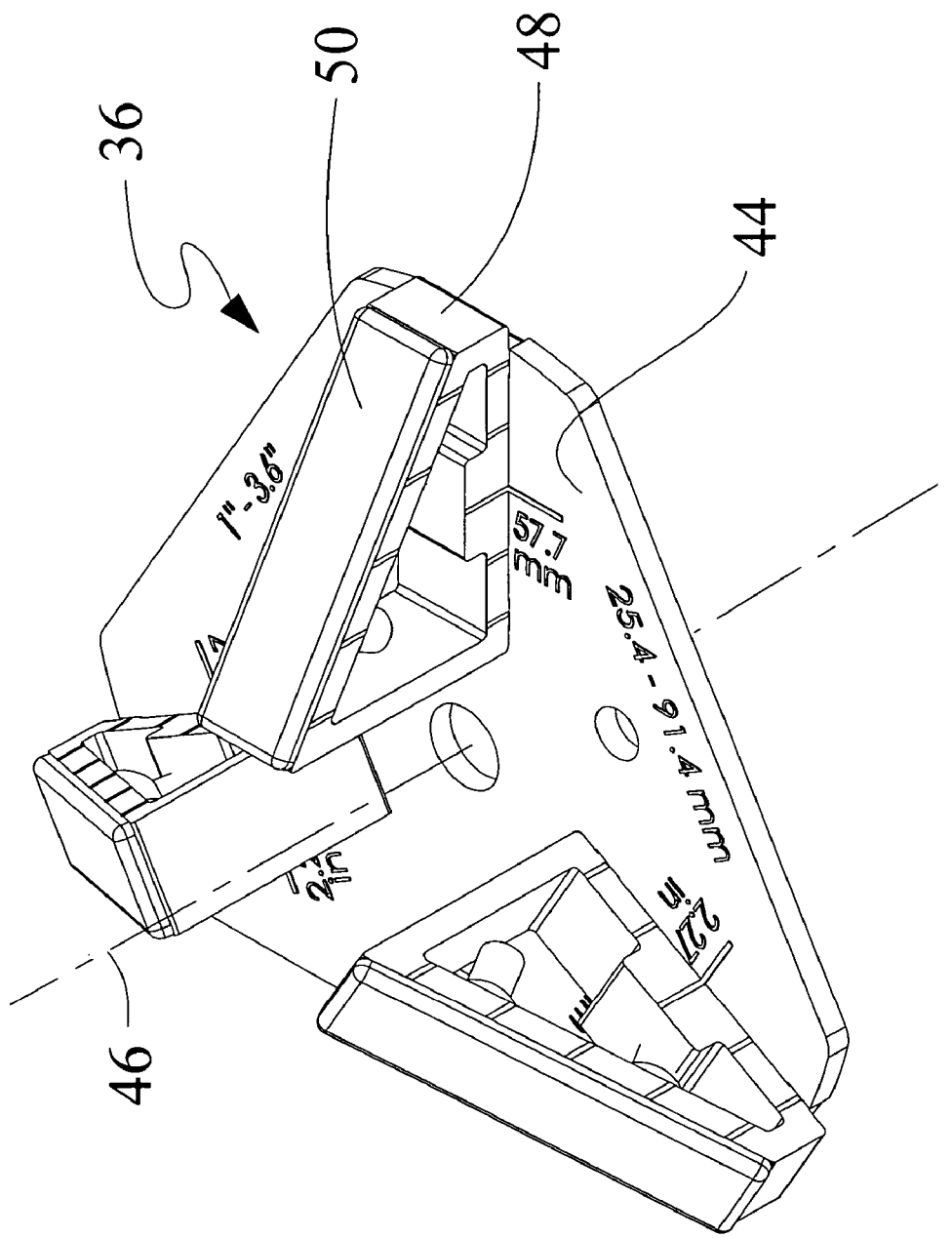
FIG. 4 is a perspective view of the chuck of FIG. 2 with the mount brackets defining a effectively convex contact surface.
Figure 5:
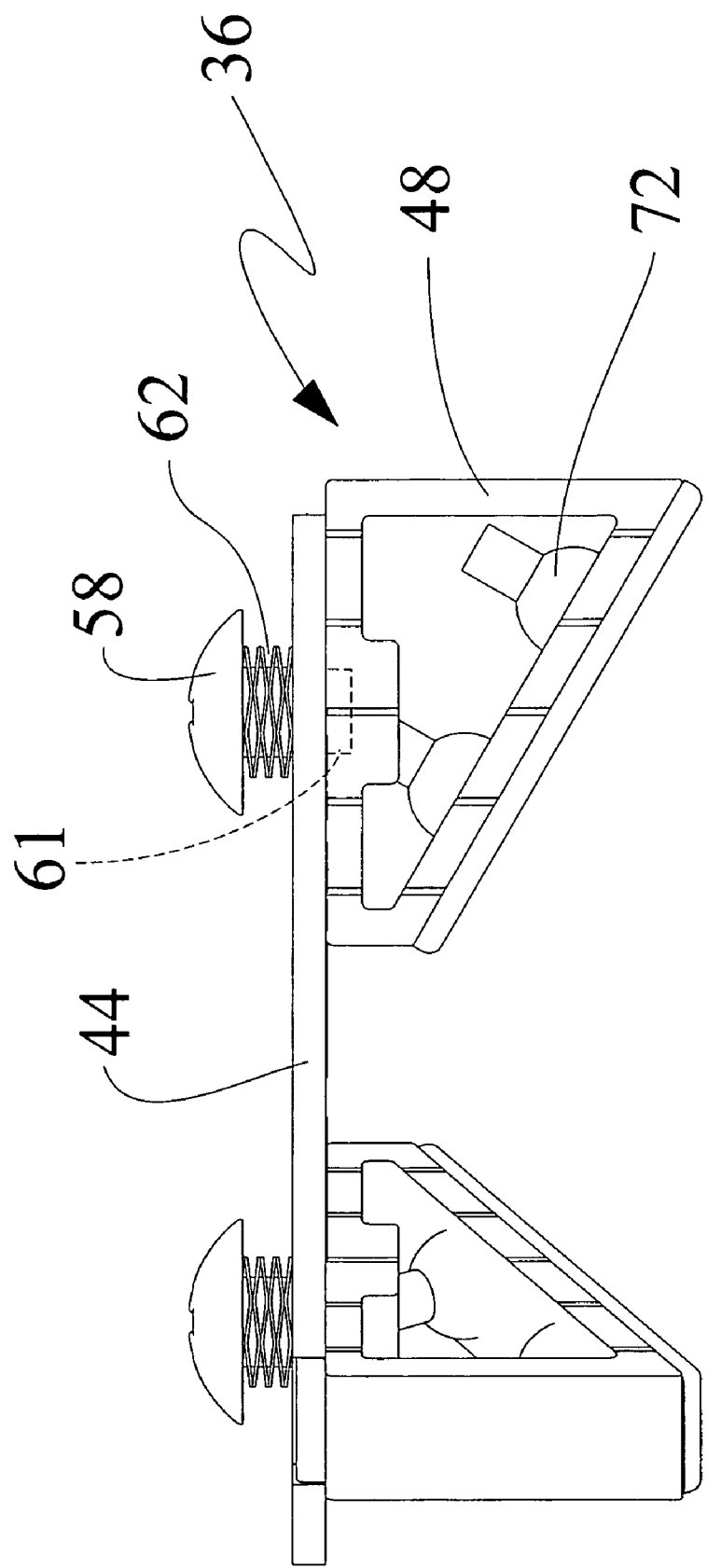
FIG. 5 is a side elevation view of the chuck of FIG. 2.

The chuck 36 configured with the inclined contact surfaces 50 and the mount brackets 48 inclined toward the chuck plate axis 46 defines an effectively concave contact surface for engaging the outer diameter of a work piece. This is illustrated with the chuck 36 associated with the slave spindle 34 in FIG. 1 receiving the outer diameter of the work piece 38. With the inclined surfaces inclined away from the plate axis 46 as illustrated in FIG. 4, the inclined contact surfaces 50 define an effective convex contact surface for engaging the inner diameter of a work piece. This engagement is illustrated in FIG. 1 with the chuck 36 operatively associated with the master spindle 24 received in the inner diameter of the work piece 38.

In use, when configuring the laser cutting/engraving rotary fixture 10 for engraving of a cylindrical object such as the work piece 38, the mount brackets 48 are configured in their effective concave and convex surfaces to engage an outer and inner diameter of a work piece as required. Thereafter the work piece is manually held between the respective contact surfaces of the chucks 36 and the actuator handle 22 is depressed to disengage the brake 20 so that the lateral clamp 18 can be moved laterally toward the master spindle 24 to axially compress the work piece 38 about the spindle axis of rotation 28 as illustrated in FIG. 1. Thereafter, the laser cutting/engraving rotary fixture can be programmed using the control panel 32 to control rotation of the work piece relatively to the laser beam source. A screw 74 is provided on the frame opposite the vertical end panel 26 to allow the frame to be inclined so that work pieces having axially inclined engraving surfaces can be accommodated.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. A chuck for a laser cutting/engraving rotary fixture, the chuck comprising:
   a chuck plate having a chuck plate axis of rotation; and
   at least two mount brackets spaced symmetrically radially with respect to one another about the chuck plate axis of rotation, each mount bracket comprising an inclined contact surface, each mount bracket being rotatably attached to the chuck plate about a mount bracket axis of rotation, whereby the inclined contact surface can be selectively rotated between a first position with the inclined contact surface inclined toward the chuck plate axis of rotation and a second select position with the inclined contact surface inclined away from the mount bracket axis of rotation.

2. The chuck of claim 1 further comprising means for releasably securing each mount bracket in one of the first and second positions.

3. The chuck of claim 2 wherein the releasably securing means comprises at least one mating projection and hole radially spaced from the mount bracket axis of rotation between the chuck plate and each mount bracket.

4. The chuck of claim 3 wherein the projection comprises a spring detent.

5. The chuck of claim 3 wherein the projection comprises a post and the releasably securing means further comprises a spring biasing each post and hole into mating engagement.

6. The chuck of claim 3 wherein the releasably securing means further comprises at least two mating projections and holes symmetrically disposed relative to the mount bracket axis of rotation.

7. The chuck of claim 1 further comprising an engagement pad attached to the inclined contact surface.

8. The chuck of claim 5 wherein the releasably securing means further comprises each mount bracket having a base with a threaded hole along the mount bracket axis of rotation, a hole in the chuck plate axially aligned with the mount bracket axis of rotation, a screw having head and threaded shaft, the threaded shaft threadably engaging the threaded hole through the hole in the chuck plate and a spring between the chuck plate and the screw head.

9. The chuck of claim 5 wherein the releasably securing means further comprises each mount bracket having a base with a hole along the mount bracket axis of rotation, a hole in the chuck plate axially aligned with the mount bracket axis of rotation, a pin having radial grooves at each end, the pin axially engaging the hole in the bracket base and the hole through the chuck plate, a retaining clip received in each radial groove, and a spring between the chuck plate and an adjacent retaining clip.

10. A laser cutting/engraving rotary fixture comprising:
    opposing master and slave spindles rotatable about a spindle axis of rotation mounted to a frame;
    means for moving the slave spindle axially along the spindle axis of rotation relative to the master spindle;
    means operatively associated with the moving means for releasably securing the slave spindle at a select axial distance from the master spindle along the spindle axis of rotation;
    a drive mechanism operatively associated with the master spindle; and
    a chuck operatively associated with each of the master and slave spindles, the chuck comprising:
      a chuck plate having a chuck plate axis of rotation; and
      at least two mount brackets spaced symmetrically radially with respect to one another about the chuck plate axis of rotation, each mount bracket comprising an inclined contact surface, each mount bracket being rotatably attached to chuck plate about a mount bracket axis of rotation, whereby the inclined contact surface can be selectively rotated between a first position within the inclined contact surface inclined toward the chuck plate axis of rotation and a second select position with the inclined contact surface inclined away from the mount bracket axis of rotation.

11. The laser cutting/engraving rotary fixture of claim 10 comprising means for releasably securing each mount bracket in one of the first and second positions.

12. The laser cutting/engraving rotary fixture of claim 10 wherein the releasably securing means comprises at least one mating projection and hole radially spaced from the mount bracket axis of rotation between the chuck plate and each mount bracket.

13. The laser cutting/engraving rotary fixture of claim 10 wherein the projection comprises a spring detent.

14. The laser cutting/engraving rotary fixture of claim 10 wherein the projection comprises a post and the releasably securing means further comprises a spring biasing each post and hole into mating engagement.

15. The laser cutting/engraving rotary fixture of claim 10 wherein the releasably securing means further comprises at least two mating projections and holes symmetrically disposed relative to the mount bracket axis of rotation.

16. The laser cutting/engraving rotary fixture of claim 10 further comprising an engagement pad attached to the inclined contact surface.

17. The laser cutting/engraving rotary fixture of claim 10 wherein the releasably securing means further comprises each mount bracket having a base with a threaded hole along the mount bracket axis of rotation, a hole in the chuck plate axially aligned with the mount bracket axis of rotation, a screw having head and threaded shaft, the threaded shaft threadably engaging the threaded hole through the hole in the chuck plate and a spring between the chuck plate and the screw head.

18. The laser cutting/engraving rotary fixture of claim 10 wherein the releasably securing means further comprises each mount bracket having a base with a hole along the mount bracket axis of rotation, a hole in the chuck plate axially aligned with the mount bracket axis of rotation, a pin having radial grooves at each end, the pin axially engaging the hole in the bracket base and the hole through the chuck plate, a retaining clip received in each radial groove, and a spring between the chuck plate and an adjacent retaining clip.

* * * * *